(12) United States Patent
Bermel et al.

(10) Patent No.: US 7,868,259 B2
(45) Date of Patent: Jan. 11, 2011

(54) DEVICE AND METHOD FOR PRODUCING A DEVICE

(75) Inventors: Andreas Bermel, Frankfurt am Main (DE); Thomas Krohn, Schwalbach (DE); Uwe Neumann-Henneberg, Eppingen (DE)

(73) Assignee: Siemens VDO Automotive AG, Regensburg (DE)

( * ) Notice: Subject to any disclaimer, the term of this patent is extended or adjusted under 35 U.S.C. 154(b) by 608 days.

(21) Appl. No.: 11/921,833

(22) PCT Filed: Jun. 2, 2006

(86) PCT No.: PCT/EP2006/062865

§ 371 (c)(1),
(2), (4) Date: Dec. 6, 2007

(87) PCT Pub. No.: WO2006/131499

PCT Pub. Date: Dec. 14, 2006

(65) Prior Publication Data

US 2010/0136818 A1    Jun. 3, 2010

(30) Foreign Application Priority Data

Jun. 7, 2005    (DE) .................. 10 2005 026 205

(51) Int. Cl.
*H01R 13/502* (2006.01)

(52) U.S. Cl. ...................... 174/560; 174/520

(58) Field of Classification Search ............. 174/520, 174/541, 560; 361/752
See application file for complete search history.

(56) References Cited

U.S. PATENT DOCUMENTS 5,138,114 A * 8/1992 Breit et al. ............. 174/546

(Continued)

FOREIGN PATENT DOCUMENTS

EP    1 486 314    12/2004

(Continued)

OTHER PUBLICATIONS

XP002312668 BASF Plastics key to your success Technische Information für Experten 02/00 Laserstrahlschweißen von Thermoplasten im Durschstrahlverfahren.

(Continued)

*Primary Examiner*—Hung V Ngo
(74) *Attorney, Agent, or Firm*—Cohen Pontani Lieberman & Pavane LLP

(57) ABSTRACT

A device has a housing (1) with a frame element (8) which is arranged within the housing (1). The frame element (8) accommodates at least one component and has at least one bending arm (12). The bending arm (12) is designed such that a contact region (36) of the bending arm (12) bears with prestress against a contact region (38) of a wall (34) of the housing (1) in a mounted state within the housing (1). The bending arm (12) is cohesively connected to the housing (1) by means of transmission laser welding by supplying a laser beam (46) of prespecified wavelength to the device in such a way that the laser beam is transmitted through the housing (1) to the contact region (36) of the bending arm (12). At least one region of the housing (1), through which region the laser beam is transmitted, is produced from a material which is transparent to the prespecified wavelength of the laser beam (46). The contact region (36) of the bending arm (12) is produced from a material which is absorbent for the wavelength of the laser beam (46).

8 Claims, 2 Drawing Sheets

U.S. PATENT DOCUMENTS

| | | | | |
|---|---|---|---|---|
| 5,250,845 A | * | 10/1993 | Runyan | 257/729 |
| 5,365,108 A | * | 11/1994 | Anderson et al. | 257/678 |
| 6,552,911 B1 | * | 4/2003 | Mayer et al. | 361/752 |
| 6,576,836 B2 | * | 6/2003 | Erben | 174/528 |
| 6,670,548 B2 | * | 12/2003 | Sumida et al. | 174/50 |
| 6,724,627 B2 | * | 4/2004 | Onizuka et al. | 361/704 |
| 7,186,912 B2 | * | 3/2007 | Guan et al. | 174/50 |
| 7,207,634 B2 | | 4/2007 | Yamabuki et al. | |
| 7,568,958 B2 | * | 8/2009 | Vigier | 439/876 |
| 2005/0082265 A1 | | 4/2005 | Yamabuki et al. | |

FOREIGN PATENT DOCUMENTS

| | | |
|---|---|---|
| EP | 1 504 879 | 2/2005 |

OTHER PUBLICATIONS

International Search Report dated Sep. 22, 2006 issued in corresponding application 2005P07256WO.

German Office Action dated Feb. 9, 2006 issued in corresponding application 10 2005 026 205.8-16.

\* cited by examiner

DEVICE AND METHOD FOR PRODUCING A DEVICE

CROSS-REFERENCE TO RELATED APPLICATIONS

This is a U.S. national stage of application No. PCT/EP2006/062865, filed on 2 Jun. 2006. Priority is claimed on German application no. 10 2005 026 205.8, filed 7 Jun. 2005,

BACKGROUND OF THE INVENTION

The invention relates to a device and a method for producing a device with a housing and with a frame element, which is arranged within the housing and accommodates at least one component. A device of this type may be, for example, a control device for an internal combustion engine or else a control device for an electrically adjustable brake of a vehicle which uses an electromotive servodrive to produce a braking force that is supplied to the respective brakes at wheels of a vehicle.

On account of the often only small space that is available for the device, a challenge is to make the device as compact as possible.

Technical information on the laser welding of thermoplastics by the transmission method can be electronically called up under http://www.basf.de/basf/img/dienstl/bauteil/images/laserstra hlschweissen.pdf. It is known from the document that the joining process in laser welding leads to the conversion of radiation energy into heat by absorption in the corresponding material and, as a result, a locally limited melt is formed in the joining zone. Shortwave infrared radiation is intended to penetrate the upper transmitting part being joined as unhindered as possible and to be completely absorbed and converted into heat at a depth of 0.1 to 0.5 mm in a lower part being joined. The introduction of energy has the effect that, in the region of the absorption, the lower part being joined is heated and melted. The melt formation brings about a heat transfer between the two parts being joined and so the part being joined that is transparent with respect to the laser radiation is also melted. The intensity of the absorption is determined not only by the chosen material and its additives but also by the wavelength of the radiation source.

SUMMARY OF THE INVENTION

An object of the invention according to a first aspect is to provide a method for producing a device by means of which a compact device can be easily produced. The object of the invention according to a second aspect is to provide a device which is compact.

The invention is distinguished according to a first aspect by a method for producing a device with a housing and a frame element which is arranged within the housing, accommodates at least one component, in particular an electrical or electronic component, and has at least one bending arm. The bending arm is formed in such a way that, in a mounted state, in particular a freely mounted state, within the housing, a contact region of the bending arm bears with prestress against a contact region of a wall of the housing. For this purpose, the bending arm is preferably elastically bendable and formed in such a way that, in the freely mounted state within the housing, it is elastically deflected by a wall of the housing and consequently bears against the latter with prestress.

The bending arm is cohesively connected to the housing by means of transmission laser welding by subjecting the device to a laser beam of a prescribed wavelength in such a way that the laser beam is transmitted through the housing to the contact region of the bending arm. The housing is produced from a material which is transparent with respect to the prescribed wavelength of the laser beam, at least in a region through which the laser beam is transmitted. The contact region of the bending arm is produced from a material which is absorbent with respect to the prescribed wavelength of the laser beam. The method is distinguished by the fact that the device can be formed in a particularly compact manner and at the same time reliable fixing of the frame element is also easily possible, even if it is completely enclosed by the housing. A reliable and high-quality welded connection can surprisingly easily be ensured by the contact region of the bending arm bearing with prestress against the wall of the housing.

According to an advantageous refinement of the method, the bending arm is elastically formed in such a way that, in the mounted state, it bears with a prescribed prestress against the contact region of the housing and, on the other hand, is stiff enough to compensate for vibrations to which the frame element is exposed. A very high-quality and reliable welded connection can in this way be easily ensured, with at the same time a low probability of the frame element undergoing mechanical damage during operation, in particular when it is used in a motor vehicle, in which the device may be exposed to high vibrational loads.

According to a further advantageous refinement of the method, a lug is formed on the contact region of the bending arm. In this way it is possible not only for the prestress to be suitably set in an easy way, but also for a favorable mass distribution of the material that is to melt during the transmission welding to be easily achieved and a larger region to be used for the welding in comparison with when the lug is not present. This has the advantage that a defined contact contour is formed even when there is varying bending of the bending arm. For example in the case of a part-spherical formation of the lug, the contact contour is merely dependent on the radius of the part-sphere.

According to a further advantageous refinement of the method, on the bending arm there is formed a shielding body, which is facing away from the contact region of the housing with respect to the contact region of the bending arm and extends in line with the contact region of the housing beyond the contact region of the bending arm. In this way, the probability of the at least one component undergoing damage in the event of incorrect positioning of the laser beam can be significantly reduced. In this way, a lower failure rate can be ensured during production, in particular if the frame element has a number of bending arms, and so the reliability of the device is easily ensured in the event of incorrect fixing of an individual bending arm.

According to a further advantageous refinement of the method, the transmission laser welding takes place in the form of simultaneous transmission laser welding.

According to a second aspect, the invention is distinguished by a device with a housing and a frame element, which is arranged within the housing, accommodates at least one component and has at least one bending arm, the bending arm being formed in such a way that, in a mounted state within the housing, a contact region of the bending arm bears with prestress against a contact region of a wall of the housing. The at least one bending arm is cohesively connected to the housing by means of transmission laser welding. The housing is produced from a material which is transparent with respect to the prescribed wavelength of the laser beam, at least in a region through which a laser beam is transmitted for the transmission welding. A contact region of the bending arm in which the bending arm is welded to the housing is produced from a material which is absorbent with respect to the prescribed wavelength of the laser beam. The housing and its advantageous refinements correspond to the method for producing the housing. The same applies to the advantages.

BRIEF DESCRIPTION OF THE DRAWINGS

Exemplary embodiments of the invention are explained below on the basis of the schematic drawings, in which.

DETAILED DESCRIPTION OF THE PREFERRED EMBODIMENTS

Figure 1:
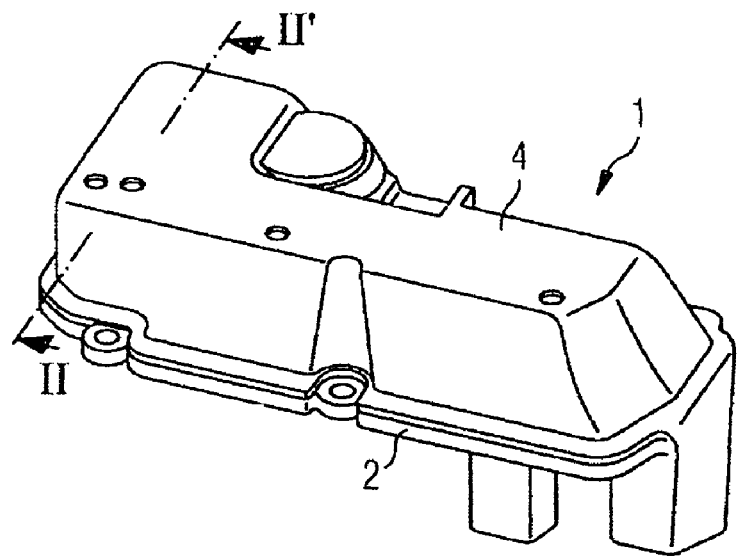
FIG. 1 is a perspective view of a device according to an embodiment of the present invention.
Figure 2:
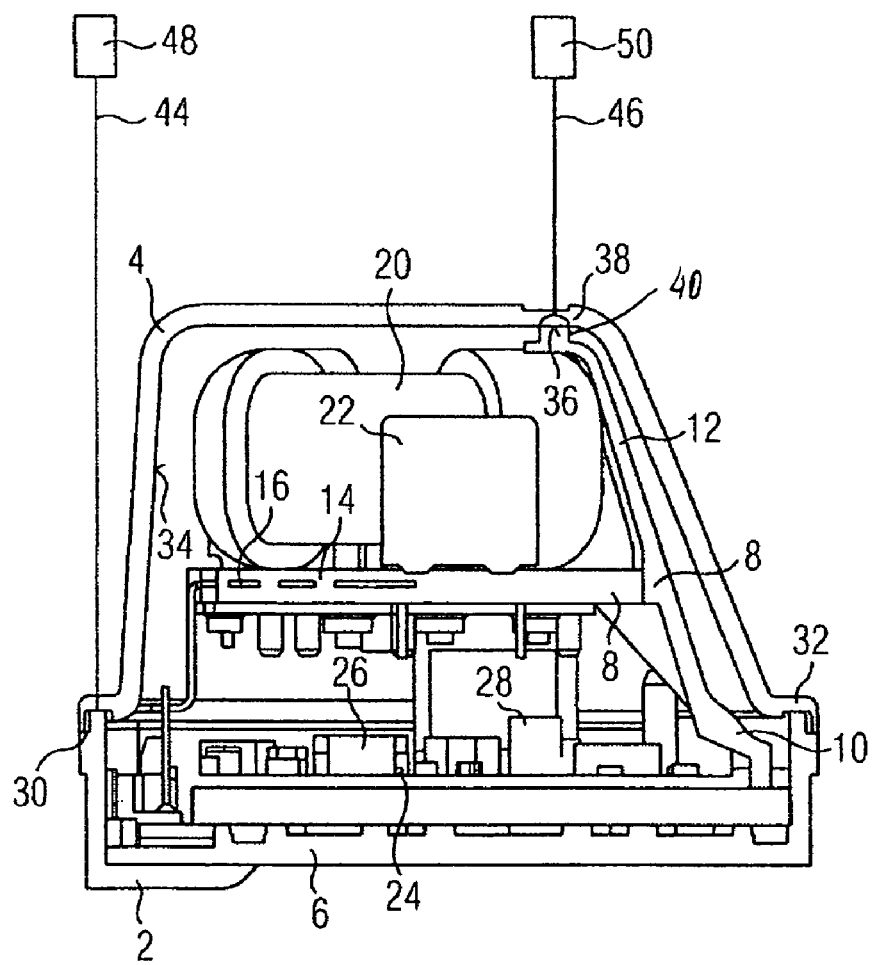
FIG. 2 shows a cross section through the device according to FIG. 1 along a line II, II'.

A device (FIG. 1) comprises a housing 1, which comprises a base part 2 and a cover 4. The cover 4 and the base part 2 are preferably produced from a plastic, for example from a thermoplastic material such as PBT GF30. The housing accommodates a plate 6, which preferably consists of aluminum. The plate 6 rests on the base part 2.

Also provided in the housing is a frame element 8, which comprises a supporting foot 10, at least one bending arm 12 and a receiving region 14. The frame element 8 preferably also comprises plastic as its material, in particular a thermoplastic material, for example PBT GF30. In this embodiment, the frame element 8 has a number of supporting feet 10, with which it is supported on the plate 6. It is preferably placed with the supporting feet 10 on the plate 6.

The receiving region 14 is formed for receiving components, such as a choke coil 20 and a capacitor 22. A leadframe 16 may also be provided in the receiving region 14 for the electrical contacting of the components that are on the receiving region.

The bending arm 12 is formed in such a way that, when the cover 4 is placed on, said arm is elastically bent by said cover and so, on an inner wall 34 of the cover, it is then in contact under prestress with a contact region 38 of the cover 4 in a contact region 36 of the bending arm, to be precise whenever the cover 4 is bearing with a bearing region 32 of the cover 4 against a bearing region 30 of the base part 2. The material of the bending arm 12 and its geometry are appropriately chosen, on the one hand to ensure elastic bending of the bending arm and on the other hand to ensure that, in a state in which it is cohesively connected to the cover 4 in a fully produced state of the device, it has adequate mechanical stability to withstand mechanical loads of the frame element 8 that are induced by forces of acceleration which act on the device and depend on the masses of the components that are fastened on the frame element 8 in its receiving region 14.

Figure 3:
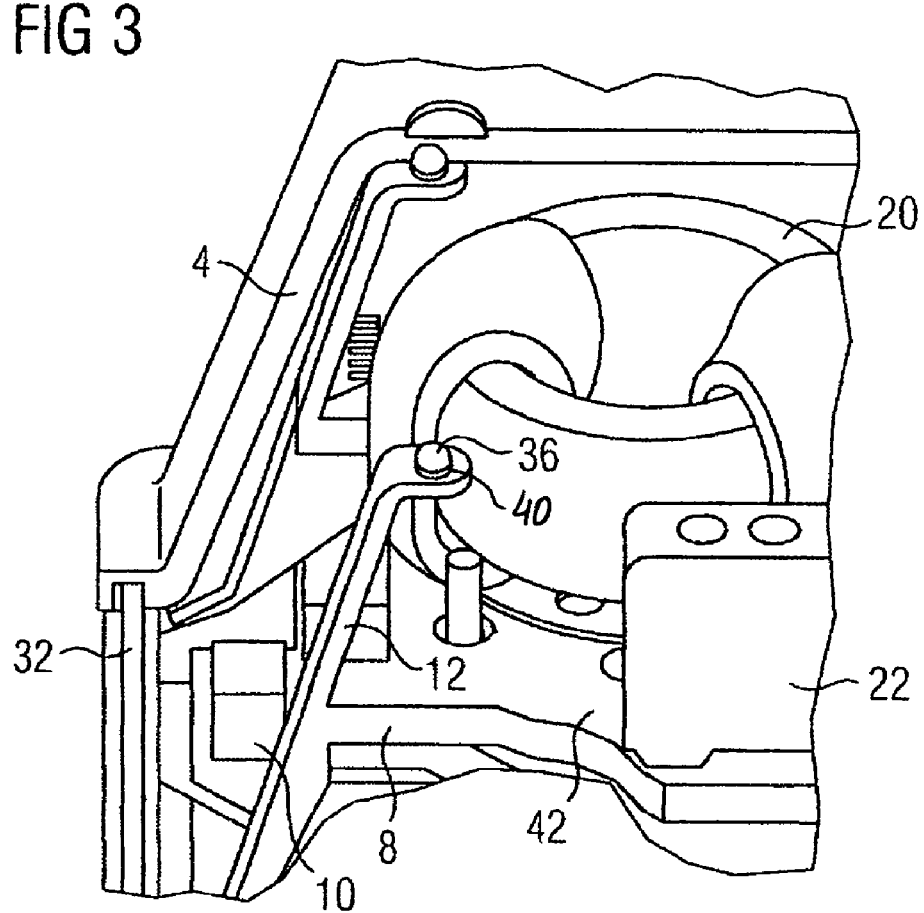
FIG. 3 shows a three-dimensional partial sectional representation of a part of the device according to FIG. 1

A number of bending arms are preferably formed in the frame element 8, for example two or any number of bending arms 12. In the section according to FIG. 3, for example, two bending arms 12 are represented.

Furthermore, also arranged in the housing is a printed circuit board 24, which is for example also formed as a flexible foil and accommodated on which are further components 26, 28, which may for example be electrical or electronic components or else integrated circuits or the like.

The bending arm 12 has a lug 40, which is formed on the contact region 36 of the bending arm. Furthermore, it has a shielding body 42, which is facing away from the contact region 38 of the cover with respect to the contact region 36 of the bending arm 12 and extends in line with the contact region 38 of the cover 4 beyond the contact region 36 of the bending arm 12.

Figure 4:
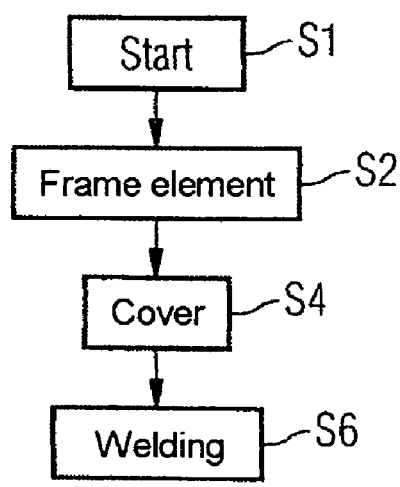
FIG. 4 shows a flow diagram of the sequence when the device is produced.

The production procedure is explained in more detail below on the basis of the flow diagram of FIG. 4. A program is started in a step S1.

In a step S2, the frame element 8 is produced. For this purpose, the leadframe 16 is introduced at least partially into the receiving region 14 of the frame element. This may take place for example by injection-molding the frame element. The frame element is preferably produced from a plastic which, at least in the contact region 36 of the bending arm, is formed from a material that absorbs laser radiation of a prescribed wavelength. The material is in this case chosen such that subsequently, within a transmission laser welding step, it can be cohesively connected to a likewise suitably chosen material of the cover 4 in the contact region 38 of the cover. Suitable materials for this purpose are known, for example, from the Internet publication of BASF AG "Laserstrahlschweifen von Thermoplasten im Durchstrahlverfahren" [laser welding of thermoplastics by the transmission method], Technische Information für Experten 02/00, which has already been cited at the beginning.

Furthermore, in step S2, the components are arranged on the receiving region 14 and optionally electrically contacted, for example by the leadframe 16. Subsequently, the frame element 8 is placed in the housing 1, to be precise in such a way that it is supported with the supporting foot 10 on the plate 6. This takes place with the cover 4 not yet placed on. The plate 6 may be present, but does not necessarily have to be.

In a step S4, the cover 4 is then subsequently placed on the base part 2 in such a way that the bearing region 30 of the base part 2 is in contact with the bearing region 32 of the cover 4. In this state, the bending arm 12 is then elastically bent and contacts with its contact region 36 the contact region 38 of the cover 4, this taking place under a prescribed prestress.

In a step S6, the cover 4 is held by means of a pressing device (not represented), which preferably takes the form of a mask, in its contact with the bearing region 30 of the base part 2 and first and second laser beams 44, 46 are made to act on the cover 4 from the outside, in line with the bearing regions 30, 32 or the contact regions 36, 38. In this step, consequently, the transmission laser welding takes place, which is explained in more detail below.

The joining process during the laser welding is based on the conversion of radiation energy into heat by absorption of the material in the bearing region 30 of the base part 2 or the contact region 36 of the bending arm 12, which is suitably selected to correspond to the wavelength of the first or second laser beam 44, 46. In addition, the corresponding material of the cover 4 in the bearing region and the contact region 38 of the cover 4 is also appropriately adapted, on the one hand to the wavelength of the respective laser beam 44, 46 and on the other hand to the corresponding material with which joining is to take place. Appropriate material combinations are likewise disclosed in the aforementioned publication on laser welding, the content of which is hereby incorporated in this respect.

First and second laser sources 48, 50 are preferably provided for producing the respective laser beams 44, 46. The laser radiation is preferably shortwave infrared radiation. The respective laser beam 44, 46 penetrates the cover 4, which is transparent with respect to the respective wavelength of the laser beam 44, 46, and is subsequently absorbed in the bearing region 30 of the base part 2 or the contact region 36 of the bending arm 12 and so converted into heat. This leads to local melting of the material in the bearing region 30 of the base part 2 and the contact region 36 of the bending arm 12. The contact between the bearing regions 30, 32 and the contact regions 36, 38 has the effect that a heat transfer also takes place to the cover 4, and consequently also leads there to local melting of the material. This then ultimately leads to a cohesive connection between the cover 4 and the base part 2 or between the cover 4 and the bending arm 12.

The welding in step S6 preferably takes place in the form of simultaneous welding, in which the laser beams are deflected at high speed around the entire region to be welded. The base part 2 is preferably welded to the cover 4 around the base part 2 or around the cover 4. In addition, the bending arms, a number of which are optionally present, are then simultaneously welded to the cover. This has the advantage that a very homogeneous sinking of the cover 4 down to the base part 2 can take place. Alternatively, however, the cover 4 and the base part 2 may also be welded at a different time than the cover 4 and the bending arm 12. The welding also does not necessarily have to take place by simultaneous welding.

The provision of the shielding body 42 has the effect that it is easily possible to prevent components within the housing 1 from being damaged by the laser beam 46 even when it may be positioned rather inaccurately.

The installation space available within the housing 1 can therefore be completely filled by the components and no free spaces have to be provided for mechanical fixing of the frame element 8 to the housing by means of fastening means, such as a screw, which otherwise optionally takes place. In respect of an aspect of accessibility for corresponding tools for fastening the fastening means, this may also lead to more space within the housing 1 that can be used for the components. By forming the lug 40 on the contact region 36 of the bending arm 12, a greater tolerance can likewise be accepted with respect to the positioning accuracy of the second laser beam 46, without significantly influencing the quality of the joining process. The bending arm 12 may also be cohesively connected to the cover or else to the base part 2 at one or more other points. The welding may also be carried out as so-called mask welding, as likewise disclosed in the BASF publication.

What is claimed is:

1. A method for producing a device with a housing and a frame element arranged within the housing, the frame element accommodating at least one component and having at least one bending arm, the method comprising:

forming the bending arm such that a contact region of the bending resiliently bears with prestress against a contact region of a wall in the housing when the bending arm is in a mounted state within the housing; and cohesively connecting the bending arm to the housing by transmission laser welding by subjecting the device to a laser beam of a prescribed wavelength such that the laser beam is transmitted through the housing to the contact region of the bending arm, the housing being produced from a material which is transparent with respect to the prescribed wavelength of the laser beam, at least in a region through which the laser beam is transmitted, and the contact region of the bending arm being produced from a material which is absorbent with respect to the prescribed wavelength of the laser beam.

2. The method of claim 1, wherein the bending arm is elastically formed such that, in the mounted state, it bears with a prescribed prestress against the contact region of the housing and is sufficiently stiff to compensate for vibrations to which the frame element is exposed.

3. The method of claim 1, further comprising the step of forming a lug on the contact region of the bending arm.

4. The method of claim 1, further comprising the step of forming a shielding body on the bending arm, the shielding body facing away from the contact region of the housing with respect to the contact region of the bending arm and extends in line with the contact region of the housing beyond the contact region of the bending arm.

5. The method of claim 1, wherein the step of cohesively connecting comprises using two laser beams simultaneously performing transmission laser welding.

6. The method of claim 1, wherein the component comprises part of an in-vehicle control device.

7. A device comprising a housing and a frame element arranged within the housing, the frame element accommodating at least one component, the frame element having at least one bending arm formed such that a contact region of the bending arm bears resiliently with a prestress against a contact region of a wall of the housing when the frame element is in a mounted state within the housing, and the bending arm being cohesively connected to the housing by transmission laser welding, at least a region of the housing through which a laser beam of a prescribed wavelength is transmitted for the transmission laser welding being produced from a material which is transparent with respect to the prescribed wavelength of the laser beam, and at least the contact region of the bending arm which is welded to the housing being produced from a material which is absorbent with respect to the prescribed wavelength of the laser beam.

8. The device of claim 7, wherein the at least one component comprises part of an in-vehicle control device.

* * * * *